United States Patent
MacCormack et al.

(10) Patent No.: US 10,500,793 B2
(45) Date of Patent: Dec. 10, 2019

(54) ADHESIVE DISPENSING DEVICE

(71) Applicant: MCOR TECHNOLOGIES LIMITED, Ardee (IE)

(72) Inventors: Conor MacCormack, Ardee (IE); Fintan MacCormack, Ardee (IE)

(73) Assignee: MCOR TECHNOLOGIES LIMITED, Ardee (IE)

( * ) Notice: Subject to any disclaimer, the term of this patent is extended or adjusted under 35 U.S.C. 154(b) by 55 days.

(21) Appl. No.: 15/627,790

(22) Filed: Jun. 20, 2017

(65) Prior Publication Data

US 2017/0282203 A1 Oct. 5, 2017

Related U.S. Application Data

(63) Continuation of application No. 15/010,927, filed on Jan. 29, 2016, now Pat. No. 9,682,513, which is a
(Continued)

(30) Foreign Application Priority Data

Nov. 29, 2007 (GB) .................................. 0723386.9
Oct. 16, 2008 (GB) .................................. 0818976.3

(51) Int. Cl.
*B29C 65/52* (2006.01)
*B05C 1/08* (2006.01)
(Continued)

(52) U.S. Cl.
CPC .......... *B29C 65/526* (2013.01); *B05C 1/0808* (2013.01); *B05C 1/0817* (2013.01);
(Continued)

(58) Field of Classification Search
CPC ..... B33Y 10/00; B33Y 30/00; B32B 37/1292; B32B 29/005
(Continued)

(56) References Cited

U.S. PATENT DOCUMENTS 4,167,916 A 9/1979 Pierce
5,443,683 A 8/1995 Garrett
(Continued)

FOREIGN PATENT DOCUMENTS

EP 0776274 A1 6/1997
EP 0879693 A1 11/1998
(Continued)

OTHER PUBLICATIONS

Tari, Michael James 1998, 'An Improved Resin Transfer Molding Process', PhD thesis, The University of California Los Angeles. pp . 66-67. (Year: 1998).*
(Continued)

*Primary Examiner* — Carson Gross
(74) *Attorney, Agent, or Firm* — Schwabe Williamson & Wyatt, PC

(57) ABSTRACT

A layered object manufacturing system is described. The system is one arrangement provides for the use of water based adhesives to bind successive layers of paper in generation of a three dimensional model. The paper can be provided in conventional paper sizes and is moveable within the system from a storage stack to a build object location, individual pages at a time. The system typically effects the application of adhesive onto the paper using an adhesive applicator wheel having a plurality of circumferentially spaced apart recesses for receiving adhesive. The wheel is rotatable to convey adhesive filled in one or more recesses to a target substrate and to deposit controlled amounts of adhesive at discrete points thereon.

11 Claims, 12 Drawing Sheets

Related U.S. Application Data continuation of application No. 12/745,531, filed as application No. PCT/EP2008/066473 on Nov. 28, 2008, now Pat. No. 9,278,370.

(51) Int. Cl.

| | | |
|---|---|---|
| *B05C 1/16* | (2006.01) | |
| *B29C 64/141* | (2017.01) | |
| *B29C 64/20* | (2017.01) | |
| *B29C 64/386* | (2017.01) | |
| *B29C 64/00* | (2017.01) | |
| *B29C 64/112* | (2017.01) | |
| *B32B 37/12* | (2006.01) | |
| *B32B 29/00* | (2006.01) | |
| *B29C 64/10* | (2017.01) | |
| *B33Y 30/00* | (2015.01) | |
| *B33Y 40/00* | (2015.01) | |
| *B33Y 10/00* | (2015.01) | |
| *B33Y 50/02* | (2015.01) | |
| *B29L 9/00* | (2006.01) | |

(52) U.S. Cl.
CPC ............ *B05C 1/165* (2013.01); *B29C 64/00* (2017.08); *B29C 64/112* (2017.08); *B29C 64/141* (2017.08); *B29C 64/20* (2017.08); *B29C 64/386* (2017.08); *B29C 64/10* (2017.08); *B29L 2009/00* (2013.01); *B32B 29/005* (2013.01); *B32B 37/1292* (2013.01); *B33Y 10/00* (2014.12); *B33Y 30/00* (2014.12); *B33Y 40/00* (2014.12); *B33Y 50/02* (2014.12)

(58) Field of Classification Search
USPC .................................. 700/118, 119
See application file for complete search history.

(56) References Cited

U.S. PATENT DOCUMENTS

| | | |
|---|---|---|
| 5,578,155 A | 11/1996 | Kawaguchi |
| 6,038,971 A | 3/2000 | Fischer |
| 6,305,769 B1 | 10/2001 | Thayer et al. |
| 6,346,147 B1 | 2/2002 | Rinehart et al. |
| 6,413,360 B1 | 7/2002 | Morita et al. |
| 6,506,477 B1 | 1/2003 | Ueda et al. |
| 6,543,506 B1 | 4/2003 | Phillips |
| 6,589,471 B1 | 7/2003 | Khoshnevis |
| 9,278,370 B2 | 3/2016 | MacCormack |
| 9,682,513 B2 | 6/2017 | MacCormack |
| 2001/0050448 A1 | 12/2001 | Kubo et al. |
| 2002/0062909 A1 | 5/2002 | Jang et al. |
| 2004/0118309 A1 | 6/2004 | Fedor et al. |
| 2004/0168629 A1 | 9/2004 | Miskech et al. |
| 2008/0229941 A1 | 9/2008 | Heidari |
| 2011/0094441 A1 | 4/2011 | MacCormack |
| 2016/0144568 A1 | 5/2016 | MacCormack |

FOREIGN PATENT DOCUMENTS

| | | |
|---|---|---|
| EP | 1070548 A2 | 1/2001 |
| GB | 1399052 | 6/1975 |
| GB | 2067102 A | 7/1981 |
| GB | 2311960 A | 10/1997 |
| JP | S49111509 U | 9/1974 |
| JP | S5631872 U | 3/1981 |
| JP | H07195531 A | 8/1995 |
| JP | H10137650 A | 5/1998 |
| JP | 2001001408 A | 1/2001 |
| JP | 2005324964 A | 11/2005 |
| WO | 2001/023100 A1 | 4/2001 |
| WO | 2001/076863 A2 | 10/2001 |
| WO | 2009/068672 A1 | 6/2009 |

OTHER PUBLICATIONS

International Search Report for PCT/EP2008/066473 dated Apr. 21, 2009; 3 pages.

* cited by examiner

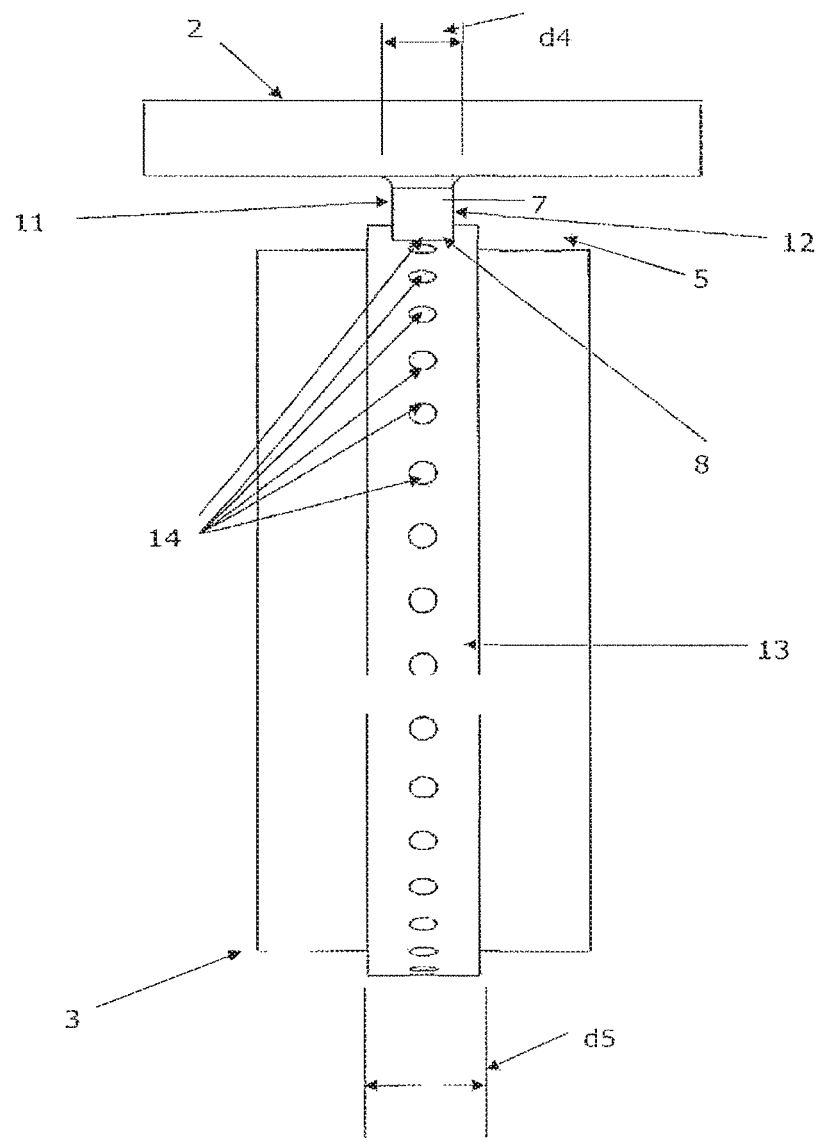
Figure 3: Front elevation of the wipe and dimpled wheel.

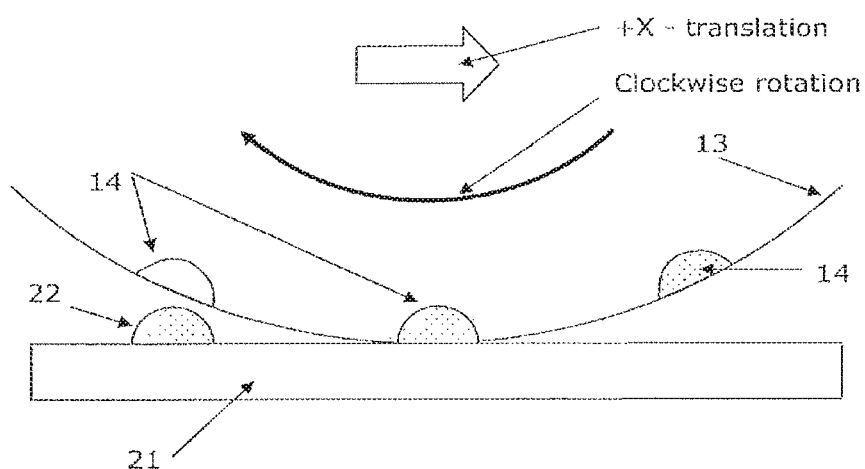
Figure 4: Schematic detailing the capillary action deposition method.

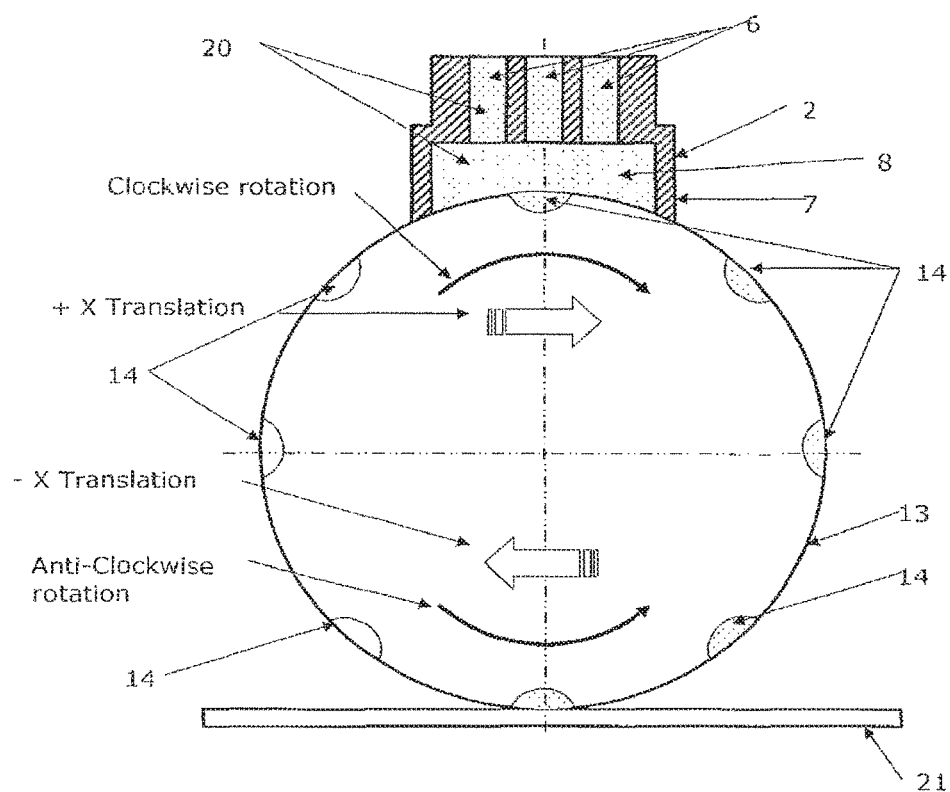
Figure 5: Priming of the adhesive wheel

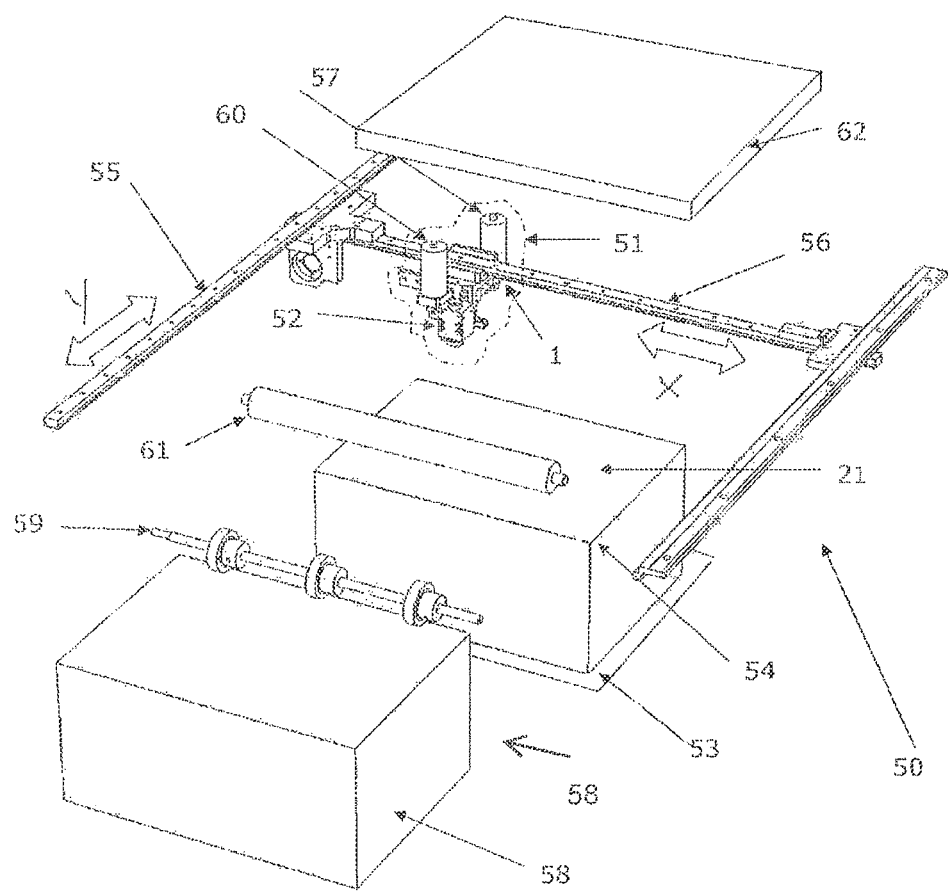
Figure 6: Basic Machine Layout: Isometric View

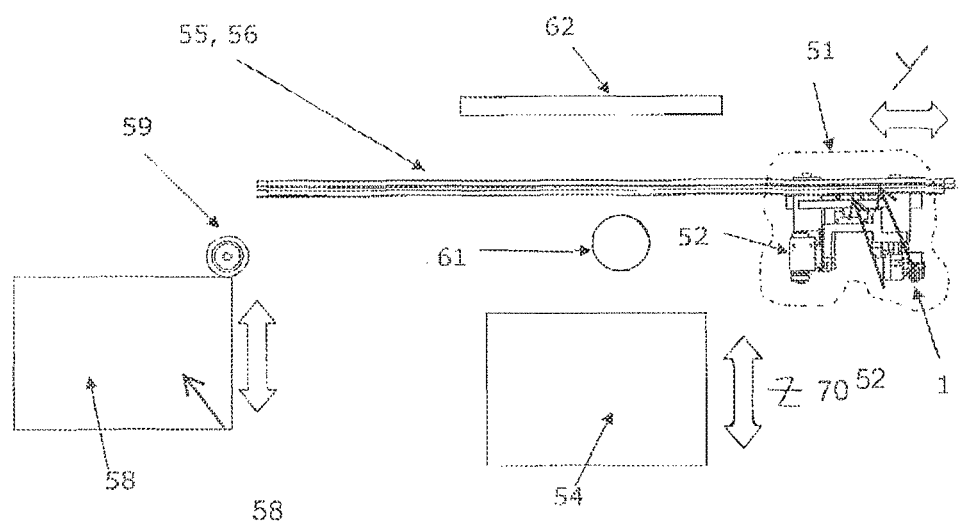
Figure 7: Basic Machine Layout: Front Elevation

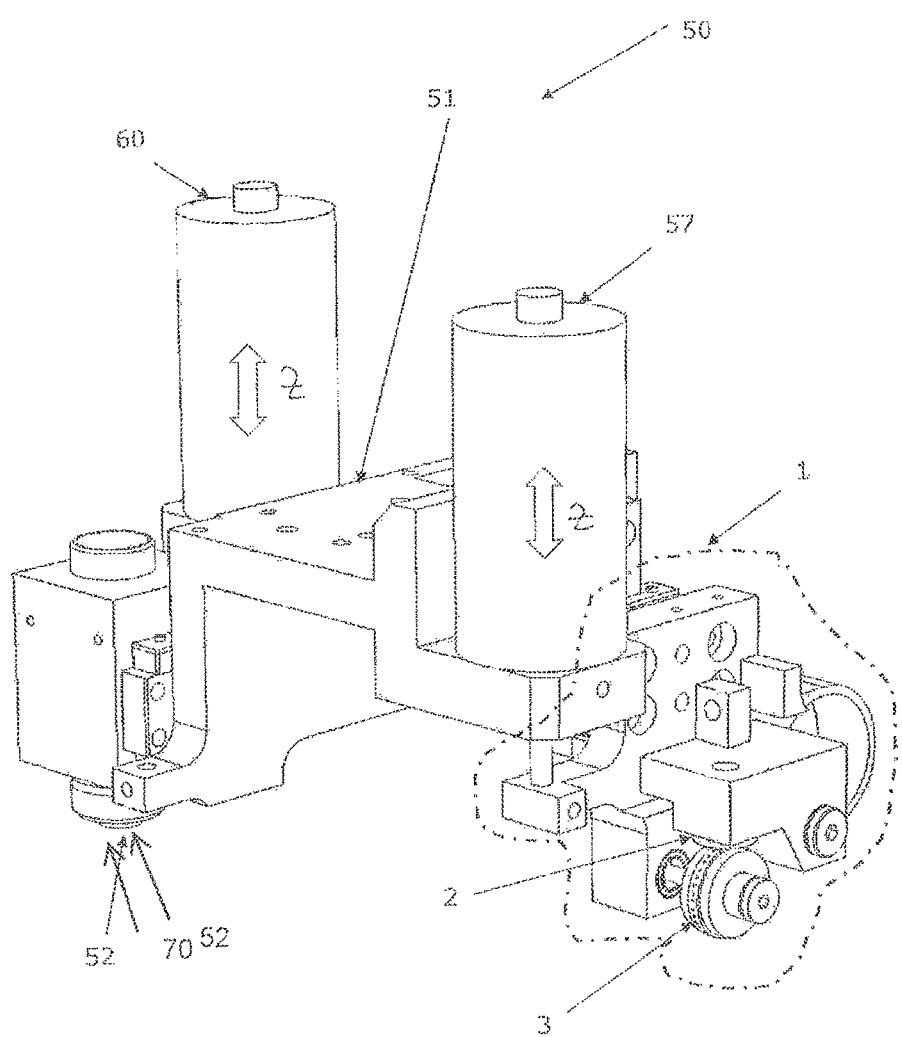
Figure 8: Isometric View of Multifunction Head

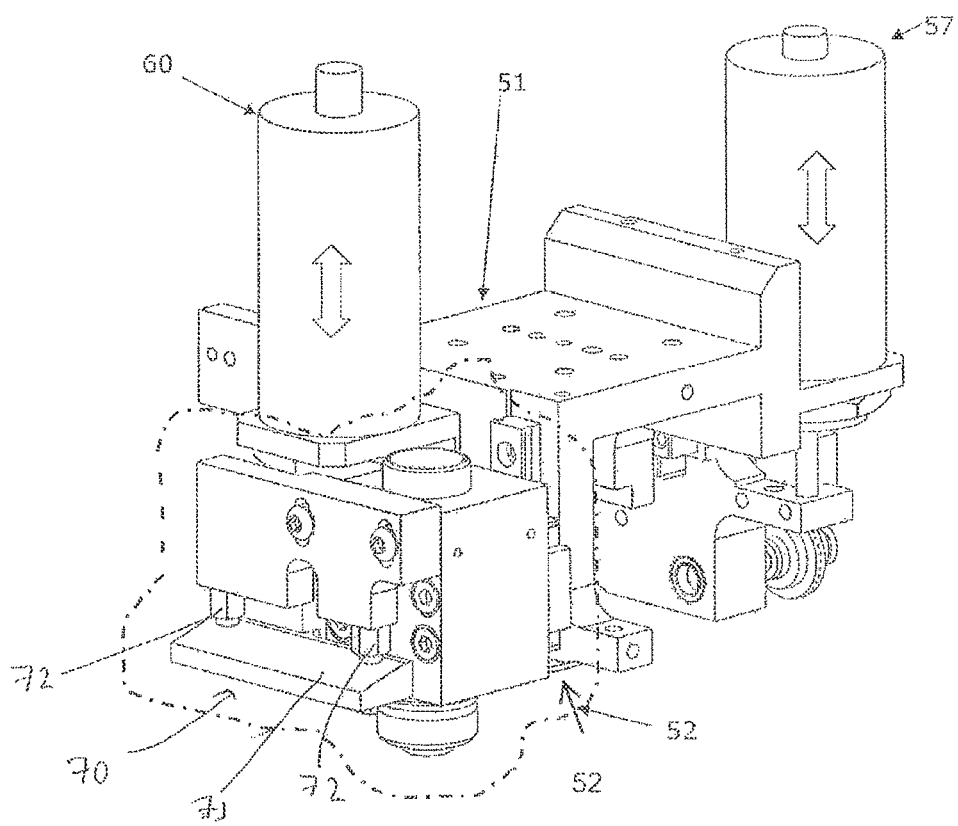
Figure 9.1: Isometric View No2 showing the Cutter / Grabber Portion

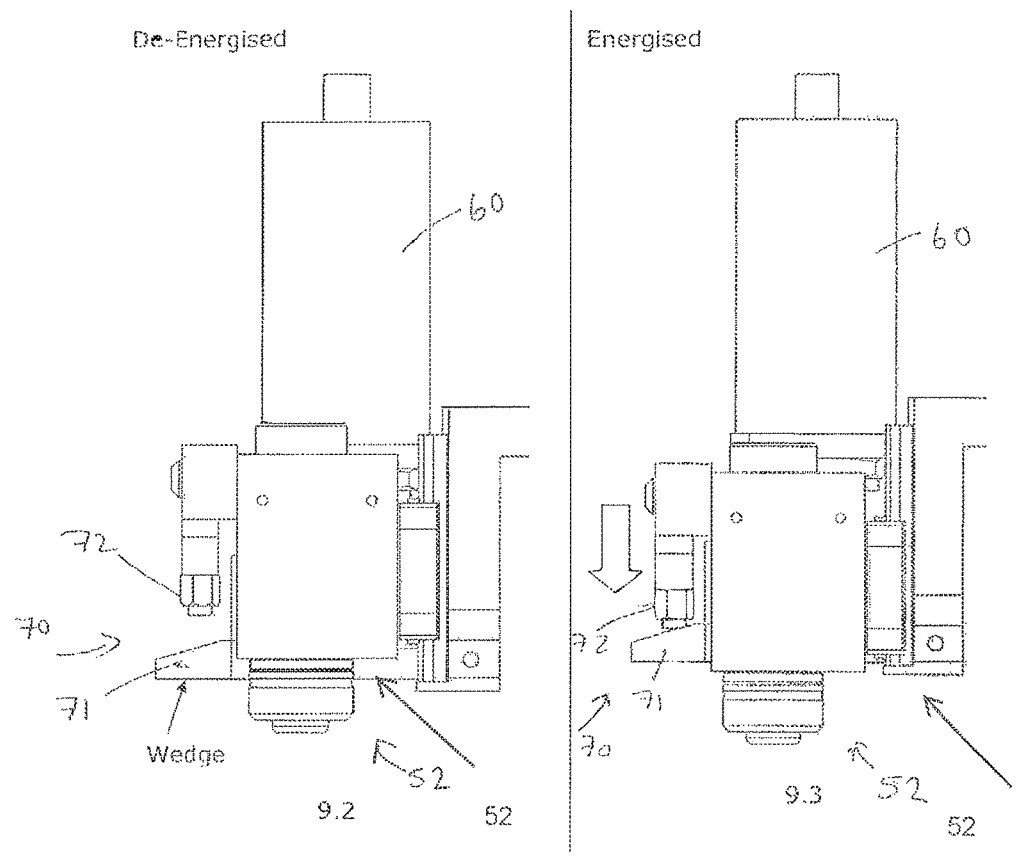
Figures 9.2 and 9.3: Grabber and wedge in a De-energised and Energised state

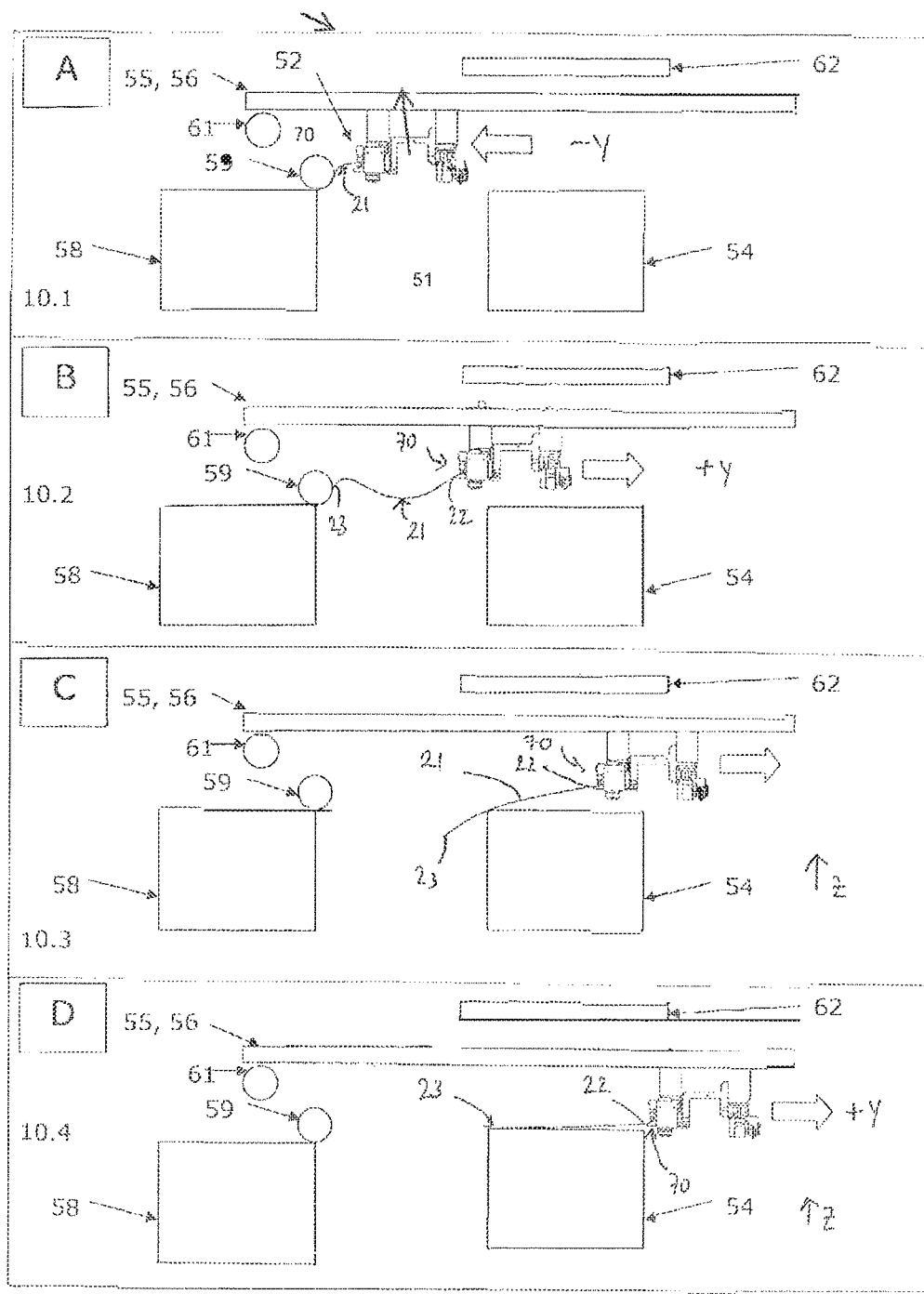
Figure 10.1-10.4:

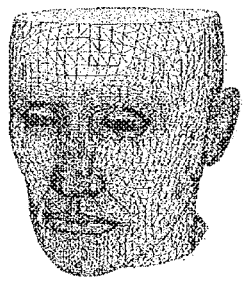
Figure 11. CAD Model of Part
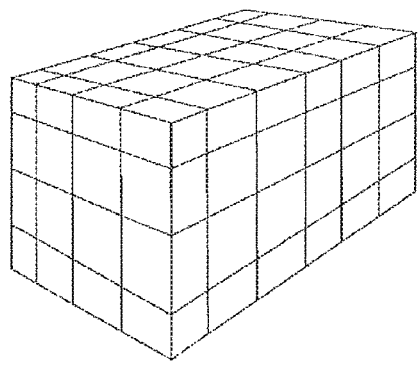
Figure 12: Un-Weeded Diced Block
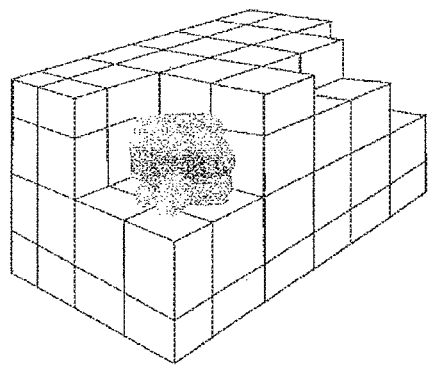
Figure 13: Partially Exposed Part
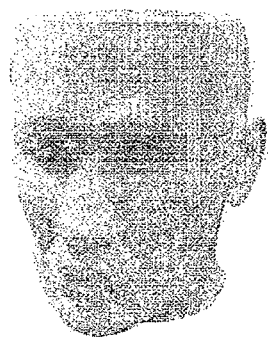
Figure 14: Finished 3D Part

ADHESIVE DISPENSING DEVICE

CROSS-REFERENCE TO RELATED APPLICATIONS

This application is a continuation of U.S. patent application Ser. No. 15/010,927, filed Jan. 29, 2016, which is a continuation of U.S. patent application Ser. No. 12/745,531, filed Dec. 30, 2010, now issued as U.S. Pat. No. 9,278,370, which is a National Stage Application of PCT/EP2008/066473, filed Nov. 28, 2008, which claims priority to United Kingdom Application 0818976.3, filed Oct. 16, 2008 and United Kingdom Application 0723386.9, filed Nov. 29, 2007, all of the disclosures of each are incorporated herein by reference.

FIELD OF THE INVENTION

The present invention relates to layered object manufacture (LOM) systems providing rapid prototyping capacity. In a preferred arrangement the invention relates to an adhesive dispensing device and in particular an adhesive dispensing device for use in applying adhesive in a Layered Object Manufacture (LOM) system for rapid prototyping (RP).

BACKGROUND

Rapid prototyping is defined as computer-controlled additive fabrication, in that an object can be fabricated by the addition of material rather than conventional machining methods that rely on removal or the subtraction of material. The term "rapid" is, it will be appreciated, a relative term but one that has specific meaning within the art, in that construction of a finished three dimensional articles can take from several hours to several days, depending on the method used and the size and complexity of the model. There are many known methodologies that are employed within the general field of rapid prototyping Layered Object Manufacture (LOM) is one form of Rapid prototyping (RP) which relates to the successive layering of adhesive-coated paper, plastic or metal laminates which are then successively glued together and cut to shape with a knife or laser cutter. LOM, similarly to other rapid prototyping techniques, involves the use of a three dimensional (3D) computer aided design (CAD) of an object/part to be made, from which a stereo-lithography (STL) or other suitable format file is generated within a CAD package. The STL file is processed and in effect virtually sliced in the Z-axis at a thickness matching the thickness of the substrate material used. This creates a series of cross sections of the part and at any particular height each one has a simple two dimensional (2D) profile. A cutting apparatus is then used to trace the 2D profiles and thus cut the shapes onto thin sheets of raw material. In LOM, each individual thin sheet is then stacked and bonded one on top of another to produce a finished 3D object.

In existing LOM systems that employ paper based raw materials, the paper is provided in the form of a roll. The roll of paper may be provided with adhesive already present on the underside. In this case, the adhesive may be activated by heat and/or pressure to form a bond onto the previous layer. In an alternative approach, adhesive may be applied to the underside of the material as it is drawn from a roll. However, there are a number of disadvantages associated with the use of roll material. For example, a machine is often operable only with specifically manufactured rolls of material, which may be expensive to obtain and/or difficult to replace. There are also disadvantages associated with the day to day use of rolls of raw material. For example, the rolls may become stuck or jammed in the feeding mechanism due to the pre-applied adhesive thereon. With the above, removal of the waste material can be very difficult because it is adhered together with the same adhesive force as the part being made. This can lead to the part being damaged during waste removal "weeding", as chisels and other sharp implements are often needed to prise the object free.

There are further limitations in the types of paper that are suitable for use in conventional LOM systems. As paper is composed of a randomly felted layer of fibre, it follows that the structure may have varying degrees of porosity. Paper is a highly porous material and contains as much as 70% air. Porosity of a sheet is an indication of the moisture absorption of the paper, or the ability of a particular sheet of paper to accept ink, water or in this case adhesive. When selecting a particular type of paper for LOM, it is important to consider the porosity of the paper.

The properties of the paper are clearly closely related to, and place limits on the types of adhesive that may be used. There are further issues and concerns relating to the application of adhesive to paper. In known printer like dispensing systems which rely on computer controlled electro-mechanical devices such as piezoelectric dispensing heads, the heads are often of a delicate nature and over long periods of inactivity these devices can become clogged and may need to be serviced, maintained and replaced frequently. Thus such arrangements may have high overheads for maintenance and repair.

Other methods of applying adhesive between paper layers include:

1. Coating the entire working area of the sheet, which as noted above produces significant difficulties when removing waste material during post processing the finished part; 2. Using a substance which when placed in certain locations on the sheet prevents adhesion at these locations. This technique has the disadvantage of effectively wasting adhesive by initially coating the entire sheet and then rendering portions of the adhesive "non-sticky" with the use of an "anti-glue" substance; or, 3. Using an electrostatic system to xerographically deposit adhesive toner onto the sheet surface like a conventional 2D printer prints ink. This method can have the disadvantage of being technically complicated and requiring specially manufactured adhesive toner.

It is further noted that current LOM systems use adhesives that are solvent based and which are not water soluble and thus present environmental issues for example, for the purposes of disposal. However, such solvent based adhesive have to date been used in LOM as the use of water based adhesives having a high wet content presents further problems such as warping and distortion of the paper which has prejudiced their application in LOM systems.

There are therefore a number of problems with adhesive dispensing devices, and adhesive dispensing devices for use in LOM systems for rapid prototyping, that need to be addressed.

SUMMARY

These needs and others are addressed by a LOM system which provides in a first arrangement for the use of water based adhesives as a binding agent for the layering process. By controlling the volume and/or location of the dispensed adhesive such a LOM system allows for the use of water based adhesives while minimising the warping or distortion of the cellulose based paper material that is used in the layering.

In another arrangement the teaching of the present invention provides a LOM system that utilises standard dimensioned paper sheets that may be taken in single sheet quantities from a storage location to workplace where adhesive may be applied to bind successive sheets of the paper to generate a layered final structure.

In another arrangement a LOM system is provided which includes control means to enable the discriminatory application of specific volumes of adhesive at specific locations on the substrate. This enables the controlled dispensing of adhesive to specific location which advantageously allows for reduced volumes of adhesive to be used and also ensures that the adhesive is applied specifically at the locations where the adhesive is required.

Such systems may employ or comprise an adhesive applicator wheel having a plurality of circumferentially spaced apart recesses for receiving adhesive, wherein the wheel is rotatable to convey adhesive filled in one or more recesses to a target substrate and to deposit controlled amounts of adhesive at discrete points thereon.

In one embodiment the wheel comprises a contact surface configured for contact with the target substrate, and wherein the plurality of recesses are formed therein.

In another embodiment the device comprises an adhesive wipe which together with the wheel defines a sealed adhesive filling chamber for filling adhesive into one or more recesses.

In a further embodiment the wipe is coupled to a pressurized supply of adhesive.

In one embodiment the wipe and defines the side walls and opening of the chamber.

In another embodiment the wipe is formed for conformity with the wheel.

In a further embodiment the sealed adhesive filling chamber comprises a vent means to enable the filling of a recess by the displacement of air from the recess and venting of the air from the chamber.

In one embodiment the vent means comprises a formation in the wipe configured for interaction with a recess.

In another embodiment the recesses of the wheel are filled as they rotate through the chamber.

In a further embodiment the contact surface is configured for sealing contact with the wipe.

In one embodiment the device comprises biasing means for maintaining the wipe in sealing contact with the wheel.

In another embodiment the contact surface is integral with the wheel.

In a further embodiment the contact surface comprises a ring mountable to the wheel.

In one embodiment the dimensions and spacing of the recesses may be varied according to the amount of adhesive to be deposited.

In another embodiment the recesses have a volume in the order of 10-50 nanolitres.

In a further embodiment the recesses have a substantially hemispherical form.

In one embodiment the contact surface is comprised of a low friction material and/or comprises a low friction coating.

In another embodiment the target substrate comprises a paper substrate.

In a further embodiment the paper is provided in sheet form.

In one embodiment the adhesive comprises a water based adhesive, for example a PVA adhesive.

In another embodiment adhesive is deposited from a filled recess to the target substrate by means of capillary action.

In a further embodiment the wheel is coupled to a wheel drive means for controlling the direction and angular velocity of rotation of the wheel.

In one embodiment the device is mounted for translation relative to a target substrate.

In another embodiment the device coupled to a drive means to control the linear velocity of the device relative to the target substrate.

In a further embodiment the angular and linear velocities are controllable to effect the laying down of variable amounts of adhesive on the target substrate as required.

The invention further provides a layered object manufacturing (LOM) system for rapid prototyping incorporating an adhesive dispensing device in accordance with the invention.

These and other features will be better understood with reference to the drawings which follow.

BRIEF DESCRIPTION OF THE DRAWINGS

The present invention will now be described with reference to the accompanying drawings in which:

FIG. 3 is a front elevation view of the device of FIG. 1 showing a wipe and dimpled wheel;

FIG. 4 is a partial cross-section from the side of the device of FIG. 1 being used to apply adhesive to a substrate in a capillary action deposition method;

FIG. 5 is a cross-sectional view from the side of the device of FIG. 1 showing priming of an adhesive wheel;

FIG. 6 is partial isometric view of the components of a Layer Object Manufacturing system incorporating an adhesive dispensing device according to an embodiment of the invention;

FIG. 7 is partially cut-away view from the front of the system of FIG. 6;

FIG. 8 is an enlarged isometric view of the multifunctional head of the system of FIGS. 6 and 7 incorporating an adhesive dispensing apparatus;

FIG. 9.1 is an enlarged isometric view of the multifunctional head of FIG. 8 from the back showing in particular details of the cutter and grabber portion; FIGS. 9.2 and 9.3 are plan views from the side showing the grabber portion in de-activated and activated states respectively;

FIGS. 10.1 to 10.4 are plan views from the side of the steps of operation of the grabber portion of the multifunctional head and feeder system to grab a sheet of substrate material from the feeder and to lay it down in position on the build object;

FIGS. 11-14 are illustrations relating to the steps of the method of LOM rapid prototyping according to the invention with FIG. 11 showing a CAD model of a part, FIG. 12 an un-weeded diced block, FIG. 13 a partially exposed part and FIG. 14 a finished 3-D part.

DETAILED DESCRIPTION OF THE DRAWINGS

Figures 1, 2:
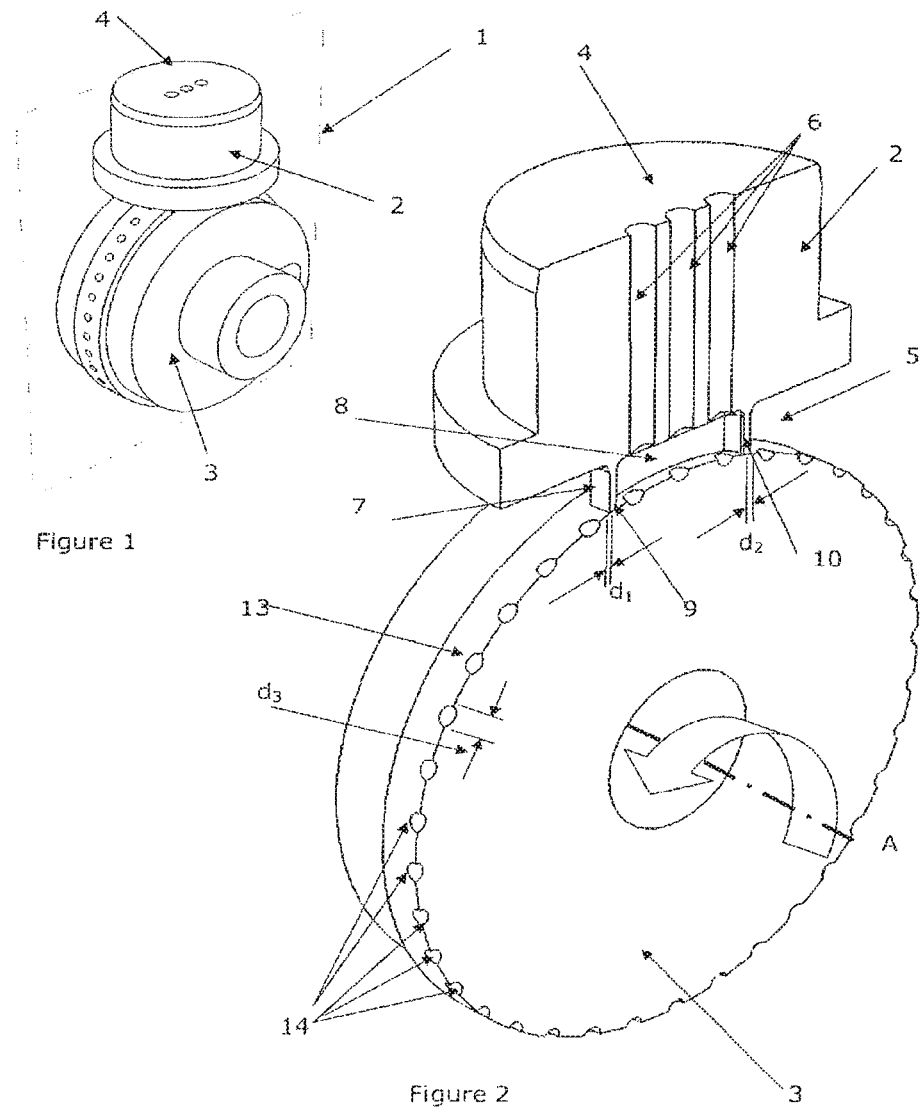
FIG. 1 is a perspective view of an adhesive dispensing device in accordance with an embodiment of the invention.
FIG. 2 is a cross-sectional view of the device of FIG. 1.

Referring to the drawings and initially in particular to FIGS. 1 to 5 specific components of a layered object manufacturing system are described. One such component is an adhesive dispensing device 1 comprising an adhesive filler 2 coupled to an adhesive applicator wheel 3. The adhesive filler 2 is connected under pressure to an adhesive feed at an inlet portion 4 and comprises one or more axial channels 6 which convey adhesive 20 from the inlet portion 4 to an adhesive outlet portion 5. The adhesive outlet portion 5 in this case comprises a chamber 8 defined by a wipe 7 together with the adhesive applicator wheel 3.

The wipe 7 depends or extends downwardly from the filler 2 and has lateral side walls 9 and 10 connected by front and back longitudinal side walls 11 and 12 defining an opening and configured to be coupled to and to contact the wheel. The wipe 7 and applicator wheel 3 are designed to correspond and co-operate to define the chamber 8 in which the wipe defines the side walls and contact surface of the wheel defines the base thereof. The dimensions and form of the wipe correspond to the wheel 3 such that when the wipe 7 is coupled to the wheel, the adhesive chamber 8 that they define is effectively a sealed chamber. The contact side or open edge of the wipe 7 comprises or is provided in an arc form corresponding substantially to the form of the wheel 3. The filler 2 comprises or may be in contact with a biasing means, for example, spring means to maintain the wipe 7 in contact with the wheel 3 to maintain the seal during rotation of the wheel.

The adhesive applicator wheel 3 comprises a contact surface 13 having a plurality of recesses 14 for receiving adhesive. Adhesive is filled into the recesses 14 at the wipe 7 and is conveyed in the recesses from the wipe to a target substrate 21 as the wheel is rotated. The form of the recesses 14 and the spacing thereof on the wheel 3 may be varied as required depending on the amounts of adhesive to be laid down. It will be appreciated that the volume of adhesive that is exposed and the duration of exposure of the adhesive to the air is minimal and as such problems such as premature curing of the adhesive are minimised.

The applicator contact surface 13 is that portion of the wheel configured to contact both the wipe 7 of the filler 2 and a target substrate, for example a sheet of paper 21. The applicator contact surface 14 may be formed on or at the circumference of the wheel 3 or integral with the wheel as in the illustrated example embodiment. The wheel may be replaceable. For example, a number of different wheels having recesses of different dimensions or of different spacing or diameter may be provided for use. Depending on the specific application, a suitable wheel may then be interchanged for other types of wheel. The contact surface 13 and/or the recesses 14 may be comprised of or formed from a low friction material, for example Delrin and/or may comprise a low friction coating, for example Teflon.

The applicator wheel 3 is coupled to a drive mechanism (not shown) which is operable by means of a controller so as to drive the wheel 3 in an anti-clockwise or clockwise direction as required. The angular velocity of the wheel is variable, as required.

The wipe 7 is configured to enable filling of the recesses 14 passing there through with adhesive 20. For the purposes of filling, the wipe 7 or sealed chamber 8 incorporates a vent means which facilitates replacement of air from a recess 14 with adhesive by allowing air to be displaced from the recess by the adhesive and providing means to remove or drive the air from the wipe/sealed chamber.

In this case, the vent means is provided by relative dimensions of the lateral side walls 9 and 10 of the wipe 7 and the recesses 14 and the manner of driven interaction of these components. In more detail, in the example embodiment, the thicknesses (d1 and d2) of those portions of the lateral side walls 9 and 10 which contact the surface 13 of the wheel 3 are less than the diameter (d3) of the recesses 14. In effect, filling with adhesive and venting of air is achieved by virtue of the design of the chamber. Depending on the direction of rotation of the wheel, one of the lateral side walls 9 and 10 will present the leading edge of the filling chamber. The lateral side walls 9 and 10 are formed such that the edges which contact the wheel 3 have an area less than the area of a recess 14. Thus, as an empty (air filled) recess 14 approaches the wipe 7 and passes under the leading side wall 9 or 10 adhesive enters the portion of the recess which has entered the wipe and displaces air therefrom via that portion of the recess which is exposed to the atmosphere. Thus the plurality of recesses 14 of the applicator wheel 3 are filled with adhesive 20 as they enter the wipe as the wheel 3 rotates. Filling is by gas or in this case air to adhesive exchange as the wheel moves relative to the wipe. Venting of a recess is by movement of the wheel which facilitates the air to adhesive exchange. Venting occurs at the point where a recess interacts with a leading or trailing edge of the wipe. If a point in the rotation of the wheel there is no recess partially or wholly under a leading or trailing edge of the wipe then the adhesive filling chamber defined by the wheel and the wipe is effectively sealed.

In more detail, the arrangement of the recesses 14 on the wheel 3 relative to the wipe 7 provides the ability to stop and restart the wheel 3 without any leakage of adhesive. To enable the wheel 3 to stop rotating without any leakage of adhesive requires that the airtight seal between the wheel 3 and the wipe 7 be maintained. An airtight seal is only possible if there are no recesses 14, either partially or wholly, under the leading/trailing edges of the wipe. In other words, an airtight seal can only exist if the exact angular relationship between each recess and the adhesive filled chamber 8 is known, so that the recesses are completely enclosed by the chamber 8 when the wheel is stopped. Stopping the wheel in this precise angular location immediately cuts off the flow of adhesive without the use of additional valves. This feature, which acts as an integral seal means, obviates the need for a doctor knife to regulate the flow of adhesive normally present on prior art designs. A further advantage of this arrangement is that the system may be left in this sealed position for extended periods of time and then restarted directly without problems such as the adhesive becoming hard as the system is sealed and no air is present. The arrangement further allows for the wheel to be stopped and started as desired without any excess build-up of adhesive. This is particularly advantageous in situations where mid process, the adhesive reservoir needs to be filled with additional adhesive and as such the process needs to be stopped for some time. By minimising the volume of adhesive that is exposed to air, such temporary cessation of the process does not materially weaken the structure of the finished product.

To facilitate this sealing mechanism, the exact angular location of each recess 14 on the wheel 3 relative to the chamber 8 and the wipe 7 needs to be known. A wheel angular position measuring device is used to detect and measure this exact angular relationship. For example, a wheel angular position measuring device may for example comprise of a proximity sensor and a metal flag. The metal flag passes under the proximity sensor once per revolution. The angular position of the metal flag relative to the holes of the wheel is known. Thus when the flag passes under the proximity sensor the machine calculates the angular revolution that is required to seal the system.

Referring to the drawings and FIG. 4 in particular, a method of deposition of adhesive using the adhesive dispensing device 1 is shown. In this case the applicator wheel 3 is positioned in contact with a target substrate 21, here, a sheet of paper. The wheel 3 is translated relative to the substrate 21 and is also rotated by the wheel drive means. The translational and rotational movements may be driven independently.

When an adhesive filled recess 14 contacts the substrate 21, in this case a porous paper substrate the adhesive is deposited onto the substrate by capillary action due to the inherent porosity or water absorption of the substrate. As the applicator wheel 3 is translated across the paper substrate 21 in a series of indexing lines, a matrix of adhesive dots 22 is deposited. When the adhesive is deposited from a recess 14 that empty recess is rotated back up to the filling wipe ?/chamber 8 and the process is repeated.

It is noted from the drawings, for example FIGS. 4 and 5 that the arrangement of the recesses on the wheel is such that only one recess is in contact with the substrate at any one time. The arrangement of individual recesses which discretely contact the surface enables for the deposition of discrete dots of adhesive.

In this case, the width of the lateral side walls 9 and 10 (d4, see FIG. 3) of the contact portion of the wipe 7 is less than the width (d5) of the contact surface 13 of the wheel. This arrangement facilitates automatic cleaning of the contact surface, as the design is such that any excess adhesive adheres to the contact surface 13 and is hence deposited on the substrate on contact.

The adhesive dispensing device 1 may further comprise a cleaning mechanism for the wheel. When required, the wheel may be positioned over a cleaning area and brought into contact with a cleaning substrate for example, of a sponge, rubber or silicone based material which cleans any residual adhesive remaining on the wheel by rotating the wheel for a number of revolutions. A small quantity of a cleaning liquid may be added to the cleaning substrate to aid in the cleaning process.

As noted above the wheel 3 may be connected to a wheel drive means (not shown) to effect rotation as required in the clockwise or anti-clockwise directions, and at the required angular velocity.

In use, the adhesive dispensing device 1 mounted for translational movement relative to a substrate 21, for example an X-Y frame to enable movement of the head relative to the substrate, or alternatively the substrate may be provided mounted on an X-Y stage for movement relative to the head. An example is illustrated and further described below with reference to FIGS. 6 to 8.

There are a number of advantages of the wheel drive arrangement which incorporates independent drive means for rotation of the wheel as provided in accordance with the teaching of the invention. These include:

It enables the relative velocity between the driven wheel 3 and the paper substrate 21 to be maintained at zero by matching the angular and linear velocities.

It enables relative velocities other than zero between the wheel 3 and the paper substrate 21 to produce either spinning or skidding. Spinning has the affect of applying higher volumes of adhesive, while skidding has the effect of applying less.

It enables the wheel 3 to be cleaned by an additional means if necessary, by placing the lower portion of the wheel into a dampened sponge/rubber material (not shown) and rotated for a specified number of revolutions until any excess adhesive has been removed.

it enables the wheel 3 to be primed so that no empty recesses 14 exist prior to commencing the deposition of a line of adhesive The wheel drive means may be connected to the rotatable wheel 3 via a clutch to enable the wheel to be either driven or not which enables the wheel free-wheel.

In use, the wheel drive means may be controlled to drive with the wheel so that the difference between the angular velocity of the wheel and the linear velocity of the dispensing device relative to the substrate is zero, which prevents skidding or spinning of the wheel. The wheel drive means may be adjustable to provide a relative difference in the angular and linear velocities to effect skidding or spinning of the wheel as required to enable control of the volume of adhesive deposited at a particular point on the substrate 21, as required. The high level of control over deposition of adhesive is advantageous.

When the dispensing system reaches the end of a particular indexing line in a first, for example X axis, it is then operated in the opposite direction [−X] on the next indexing line.

However at the end of an indexing line half of the recesses 14 of the applicator wheel will be empty. To address this issue, the present invention also provides a method for priming the wheel.

This exemplary method of priming the applicator wheel is described with reference to FIG. 5 which shows the applicator wheel at the end of a line of adhesive which was laid down by rotating the wheel in the clockwise direction while moving it to the right.

The adhesive dispensing device 1 is raised from the substrate and indexed in the Y-direction to the starting position of the next adjacent line to commence movement to the left (−X direction) and rotation in the anticlockwise direction. However, rotation in the anticlockwise direction would not result in the deposition of adhesive since the recesses 14 rotating into contact with the substrate are not filled. The device 1 is thus configured such that the wheel 3 is rotated and all of the recesses 14 are filled at the start of each adhesive line.

As noted above the system enables control of the angular velocity of the wheel for the purpose of adjusting the amounts of adhesive deposited. Similarly, the control of the angular velocity provides control for the purpose of filling the recesses at the wipe 7. Under a fixed adhesive pressure, the angular velocity of the wheel 3 dictates the length of time under the leading or trailing edges of the wipe 7 where the exchange of gas takes place and causes filling of the recesses 14. Thus, rotating the wheel 3 slowly facilitates a larger fill quantity within each recess, and rotating the wheel 3 at a faster speed results in a lower fill quantity within each recess.

Different fills may be desirable within the same build. For example it might be desirable to have a higher quantity of adhesive on the part being made and a lower quantity on the waste structure around the part. Therefore to deposit lower quantities of adhesive on the waste structure the wheel 3 would be made to rotate at an angular speed which is out of sync with the linear velocity of the dispensing mechanism and hence causes skidding. Therefore enabling fewer filled recesses to make contact with the substrate over a particular length. In the case where higher level of adhesive are required for example of the part itself, the angular velocity of the wheel 3 is increased to be higher than the linear velocity of the dispensing device, and therefore cause spinning. Spinning of the adhesive wheel 3 causes more filled recesses to be brought into contact with the substrate for a given length.

The adhesive dispensing device 1 of the invention is suitable for use with a water based PVA adhesive. Due to the nature of such adhesive the open time between laying down the adhesive and drying/setting of the adhesive is long, thereby enabling sufficient time to place a subsequent substrate layers or sheets. The adhesive dispensing device 1 of the invention provides for a very accurate control of the amounts of adhesive applied to a substrate. This is achieved in part by virtue of the form and dimensions of the recesses of the applicator wheel and by the spacing of the recesses on that wheel. In particular, the adhesive dispensing device 1 may be configured and used to dispense adhesive nanodots i.e. dots of adhesive having a volume of the order of 10-50 nanolitres, preferably in the order of 20-30 nanolitres. In this way the device may be used to deposit controlled amounts of a water based adhesive and such control obviates the problem of saturation of the substrate.

Referring to the drawings and in particular FIGS. 6-8, a Layered Object Manufacturing (LOM) system 50 for rapid prototyping incorporating an adhesive dispensing device 1 is described. Referring to the drawings and in particular FIGS. 9 and 10 the substrate feed mechanism of the system is described. An exemplary method of layered object manufacture is described with reference to FIGS. 11-15.

As shown in FIG. 11, a method in accordance with the present teaching starts with a computer generated image file of the desired final model. By sequentially layering sheets of paper and cutting these as desired through the process, a final un-weeded dice block is generated, FIG. 12. As the model is encapsulated within the dice block of FIG. 12 it is necessary to break away outer segments of the dice block to reveal the fabricated model (FIG. 13). This can be continued until the model is entirely revealed (FIG. 14).

The fabrication of such a model requires a number of steps. While these will be discussed in more detail in the following pages we are setting out below with reference to FIG. 15 exemplary steps that are followed. The specific ordering of the steps need not necessarily be followed and some of the intermediary steps may be repeated depending on the specifics of the final model to be fabricated.

Figure 15:
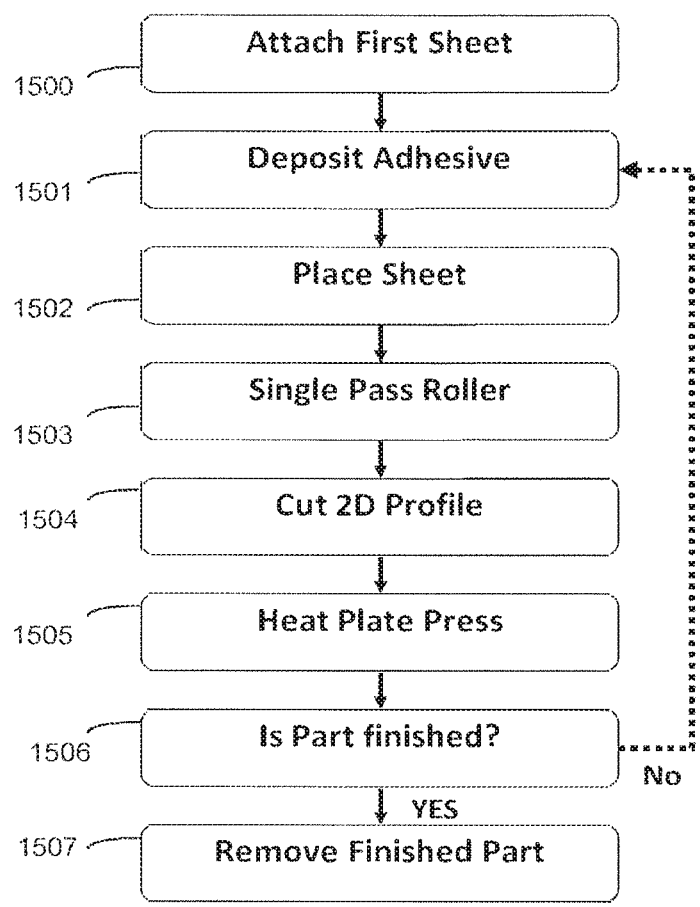
FIG. 15 is a flow chart showing the operation of the system of FIG. 6.

As shown in FIG. 15, a first sheet is moved to the work surface or block (Step 1500). Adhesive is placed on that sheet using the adhesive dispensing device (Step 1501). An additional sheet is then placed on top of the adhesive—the adhesive serving to bind or adhere the two sheets together (Step 1502). By applying a roller over the two sheets in for example a single pass, the contact between the adjacent sheets may be improved (Step 1503). Once this is achieved a cutting tool may be used to cut a template according to the desired final model on the sheet. The cutting tool may effect cutting of one or more sheets concurrently. (Step 1504). Heat may then be applied to provide for curing (Step 1505). The process is then evaluated to determine whether the preceding steps need to be repeated (Step 1506). If they do then adhesive is applied on the upper most sheet (Step 1501). If not then the finished part (in form similar to that shown in FIG. 12) is removed (Step 1507).

The LOM system 50 comprises a multifunctional head 51 comprising an adhesive dispensing device 1 and a cutter/grabber head 52. The multifunctional head 51 is operable to perform different operations in different modes. First of all the grabber 70 of the cutter/grabber portion 52 when activated operates to transfer a sheet of paper from the paper supply and to convey that paper into position on the build plate, i.e. that location where the final structure is fabricated. In performing this operation the cutter/grabber portion 52 describes a path between the build plate to the paper supply and back to the build plate. Secondly the cutter 520 of the cutter/grabber portion 52 when activated operates to cut the topmost sheet of paper on the build plate to the required form. Thirdly, the adhesive dispensing portion 1 of multifunctional head 51 when activated operates to apply adhesive, as required to the topmost sheet of paper on the build plate.

The multifunctional head 51 is mounted on an X-Y frame 55, 56, which enables the head to be positioned and moved as required over a substrate 21 on a build object 54. Movements of the dispensing device 1 and the cutter/grabber head 52 in the vertical (Z-axis) direction are controlled in this case by the respectively connected solenoids 57 and 60. Paper is feed into the system in sheet format from the sheet supply 581 via a paper feed mechanism 59. The system 50 further comprises a single pass roller 61 which is passed over the build object 54 to ensure a positive bond of subsequent layers and minimise the burr produced from the cutting action. The system 50 further comprises a hot plate 62 for applying pressure and curing the adhesive. Many of the features of the X-Y frame and the paper feed and placement are conventional and as such would be known to the skilled person in the field and are not described in detail here.

A method of use of the LOM system 50 for rapid prototyping is also provided and may be considered as follows:

Using a three dimensional (3D) computer aided design (CAD) of an object/part that we want to make (see FIG. 9); a stereolithography (STL) file is generated within the CAD package and saved. This STL file is provided to a software package which controls operation of the system 50 according to the invention.

The software operates in accordance with the LOM system 50 to generate a series of cross sections of the part and at any particular height each one a simple two dimensional (2D) profile.

Paper, in this example, sheets of A4 size, is loaded into input tray 58 of the system 50. A single sheet 21 of paper is attached to the surface of a removable build plate 53 to act as the first uncut layer of the build object 54. The first sheet may be attached manually.

A user operates the system/controller to output a control signal to the system 50 to commence building the build object 54 in 3D.

In this case, the first steps are laying down of a base for the build object, i.e. a number of layers of paper and adhesive which will not be cut. The system 50 is operable to deposit a layer of adhesive in preparation for laying down of the second sheet of paper from the paper feed mechanism. The paper feed mechanism 59 separates a single page from the top of the ream and passes it to a waiting area. The cutter/grabber head 52 of the multifunctional head 51 is operated to grab the sheet and transfer it to the build area 53, 54 where it is placed on top of the recently applied adhesive layer. The roller 61 is passed over the sheets to ensure positive bonding between the layers. These steps are repeated until a base having the desired thickness is laid down.

The system 50 then operates to lay down the sheets of paper (substrate layers) of the build object and to cut each layer to the required profile. In this way it will be appreciated that individual sheets of paper, typically A4 dimensioned, are taken from a storage location to the work area where they are layered one upon the other to effect fabrication of a final structure. By employing standard dimensioned sheets of paper, a LOM system provided in accordance with the present teaching may use conventional stationary provided reams of paper or could even employ recycling material to effect the fabrication of the final three dimensional structures.

The multifunctional head 51 moves the adhesive dispensing device 1 over the top surface of the topmost sheet of the base of the build object 54 and applies an adhesive layer prior to laying down the first sheet of paper to be provided with a cut profile. The adhesive dispensing device 1 is operated under control of solenoid 57 to bring the wheel 3 into contact with the topmost paper layer on the build object 54.

The adhesive dispensing system 1 selectively applies adhesive at a higher density at those portions of the substrate which are part of the build object, and at a lower density at those portions of the substrate which are to be cut away i.e. the waste material portions thereof. This discriminatory application of the adhesive is facilitated through the use of a control system that can accurately direct the adhesive dispensing system to specific target areas, and also by employing of an adhesive dispensing system that does not effect a dripping or other inadvertent dispensing of the adhesive between desired dispensing positions.

The multifunctional head 51 then picks up the next sheet from the paper feed mechanism 59 and places it on topmost adhesive layer of the build object 54. The roller 61 passes over the build object pressing the layers together. The cutter/grabber head 52 is operated under control of solenoid 60 to bring the cutter into contact with the topmost paper layer on the build object 54.

The X-Y positioning means 55, 56 then moves the cutter 520 to describe the path of the 20 profile of that layer and in doing so cuts out the form of that particular layer of the build object.

After the required 2D profile has been cut, the cutter 520 is operated to make a series of dicing cuts inside and outside the cut profile of that layer to aid the removal of waste material by dicing up the waste portion of the layer into small squares. Once the cutting of a layer is complete the build plate 53 is raised to make contact with a hot plate 62. This process continues until the entire 3D model has been built up layer by layer.

When the system 50 has completed the build object 54 the removable build plate 53 is removed from the machine to reveal the un-weeded diced block of paper, containing the 3D part inside (see FIG. 12). The diced cubes of waste material can now be removed by hand without any sharp implements like chisels, because the waste material received only the minimum quantity of adhesive from the adhesive dispensing apparatus. As the waste material is removed the 3D part inside becomes partially visible (see FIG. 13). Finally when all the waste material has been removed, the 30 part is fully exposed (see FIG. 14).

Referring to FIGS. 9.1 and 9.2, the substrate grabber portion 70 of the multifunctional head it described in more detail. The grabber portion 70 comprises a support surface 71 and corresponding moveable grip portion 72. The grip 72 is moveable between a first de-activated or rest state in which it located separated from the support surface (FIG. 9.2) and a second activated position where is brought into contact with the support surface 71. In practice, the grabber portion is activated to grip a sheet of substrate material, here a sheet of paper 21 which is held between the grip portion and wedge. The sheet 21 comprises a leading edge 22 and a trailing edge 23. The sheet is gripped near the leading edge 22. The wedge 71 is angled to ensure the sheet being drawn from the feeder to the build object is forced into the first mode of bending and hence does not fall or droop down at the corners. This first mode of bending is visible in FIG. 10.2 where the sheet 21 is seen to bend downwards between the grabber device 70 and the paper feed mechanism 59.

FIGS. 10.1 to 10.4 illustrate an exemplary the sequence of steps of separation of a page from the feed and placement onto the build object 54.

Referring to FIG. 10.1, the multifunctional head 51 moves (here in the −Y direction) over to the paper feed mechanism 59, where the leading edge 22 of the new sheet 21.

The multifunctional head 51 moves back in the opposite direction (here +Y direction) and at the same time the paper feed mechanism 59 feeds out the sheet 21. The speed of the paper feed 59 is set at a slightly higher rate than the linear velocity of the grabber head 70 which along with the wedge 71, causes the new sheet 21 to go into the first mode of bending as it is being drawn from the paper feed 59.

Referring to FIG. 10.2 the new page 21 is shown connected to the paper feed mechanism 59 and to grabber portion 70 in a first bending mode arrangement In this case the support surface 71 is presented at an angle of approximately 10-20 degrees which presents the page in the first bending mode in which the sheet 21 bends downwards in the middle. Placing the page into this first bending mode prevents the corners of the leading edge of the sheet to droop down and possibly hit the build 54 as the sheet 21 is been positioned. Having this wedge support surface 71 prevents the need to have a page grabber the total length of the leading edge 22.

Referring to FIG. 10.3, once the leading edge 22 of the sheet 21 (now held by the grabber portion 70) has passed over the front edge of the build object 54, the sheet is completely pulled out from the paper feed 59 and simply drapes over the edge of the build object 54.

Referring to FIG. 10.4 the multifunctional head 50 continues to move in the +Y direction until the trailing edge 23 of the new sheet 21 is aligned with the trailing edge of the build object 54. At this point, the system operates to raise the level of the build object 54 in the Z direction so that when the grabber portion 70 lets go of the new sheet 21, it only has a small distance to fall. This co-ordination of level of the build object relative to the new sheet prevents sheet misalignment.

The advantages of this method of placement of the sheet 21 using the co-ordinated operation of the feed 59 and grabber portion 70 include the speed of operation in comparison with a method in which the sheet is driven only, plus there is no need for a set of complicated rollers to feed the sheet to the desired location as you would find in prior art.

The system advantageously operates with tolerance to any misalignment as the substrate sheets and adhesive are laid down separate. Therefore, if some misalignment does occur there is no problem because the new profile has not yet been cut on the surface.

Example 1

In one example, the system of the invention is used to deposit nanodots of adhesive on a substrate and is configured as follows:

A wheel having dimensions of 15 mm (diameter)
Number of recesses 36
Volume of dot of adhesive deposited from recess is of the order of 10-50 nl, preferably 20-25 nl
Size of substrate: A4

The adhesive dispensing device of Example 1, is thus capable of depositing in one example embodiment a maximum number of 47,647 nano dots per page, with each nano dot having a maximum volume of 22.9 nl (Nano Litre). Therefore for a complete build volume, the total number of nanodots deposited would be in the order of 66 million.

This is very different from amounts used in the RP currently. For example, electromechanical dot dispensing systems may often have a life in the order of 100,000 to 1 million dots.

It will be understood therefore, that the system 50 incorporating the adhesive dispensing device 1 of the invention is thus suitable for use in the application of nanodots of adhesive for example in an LOM system for rapid prototyping.

The recesses 14, described above have a substantially hemispherical form which has the advantage of providing substantially the greatest volume for any given surface area. This form has the further advantage of facilitating the easy interchange of air and adhesive as the recesses pass under the chamber 8, since the walls of the recesses are not perpendicular with the wheel contact surface and hence reduce the likelihood of air becoming trapped under the adhesive in the cavity, which may happen if the recesses had straight sided walls.

We note that in the above example, example 1 a wheel having a diameter of 15 mm is used. It will be appreciated that the diameter of the wheel may be varied as required. However, the wheel is preferably less that 20 mm in diameter, and most preferably in the range of 15-20 mm in diameter.

As the diameter of the wheel is increased the vertical distance between the sheet substrate and the next adhesive filled cavity 14 becomes less, so they are inversely proportional, which may results in an overrun. One method to compensate for this "overrun" is to increase the pitch between the cavities so that the vertical distance increases. Alternatively the diameter of the wheel may be reduced to maintain a constant pitch between the nanodots, as in the case of the 15 mm wheel of example 1.

While in the embodiment described the wheel of the adhesive dispenser device has a single row of recesses on the wheel, it will be appreciated that a wheel may comprise more than one row of rows of recesses. Similarly, while in the embodiment described, the adhesive dispenser includes one wheel, in an alternative arrangement a number of wheels could be provided, one or more which may be independently moveable relative to others. Such arrangement would be aimed at increasing the speed of the adhesive application process. Also, it will be understood that while in the embodiment described, the recesses are equally spaced apart, in an alterative arrangement, the recesses spacing could be varied and substantially unequal. Such an arrangement would enable the deposition of different dot patterns depending on which part of the wheel was in contact.

Example 1, which relates to an example method of LOM using A4 sheets, has been provided merely as an example of the range of application and the capabilities of an adhesive dispenser device of the invention. This example relates to a use of A4 paper substrates, however, it will be clear to the skilled person that substrates of an A3 size, letter, or other suitable size may also be used.

It will be appreciated that as a system provided in accordance with the teaching of the present invention provides a 3-Dimensional model based on the successive layering of individual sheets of paper, that by providing sheets of different colours in predetermined sequences that it is possible to vary the ultimate colour topography of the final model. Indeed it will be understood that such colour variance through the Z-axis of the generated model may be used for advantageous effects such as for example the representation of different features in different colours. For example, by grading the colour paper into the paper feed mechanism it is possible to make topological maps showing different elevations with different colours. It will be also understood that as such a system uses standard paper formats for fabrication of the model, that it is a very simple exercise for the user to change the colour of the ultimate model simply by changing the colour of the base paper used. It will also be appreciated that as coloured paper is freely available in many different colours and finishes that the selection available to the user is much greater than conventional colouring available in RP machines.

The flexibility provided by the type of paper that may be used in accordance with the present teaching to enable a user to selectively uses papers of different thickness. It will be understood that paper can be provided in different thicknesses. As the sheets of paper used in the LOM arrangement of the present teaching are individually selectable it is possible for a user to change the thickness of paper changed for each job that they wish to undertake.

Such flexing or hinging of the final model can also be provided by using paper of the same thickness throughout the layering of the model and selectively cutting away elements of the model in predefined regions to have regions of different thicknesses. A region that is less thick than its neighbouring region will be more flexible than that neighbour and as such complex parts that are integrally formed but which have elements that are moveable with respect to one another may be fabricated. Such flexing of one part of the final component relative to another part is derived from the control of the geometry so fewer layers (as little as one is possible) are present at the area where flexibility is required.

The use of different thickness papers can also be used in the fabrication of the 3 dimensional models where there are regions of finer details required and others where such fine detail is not required. For example when fabricating vertical walls it is sufficient to use multiple layers of thick paper which can be cut to provide the necessary final vertical shape. If a curved surface is required this may be easier to fabricate using multiple thinner sheets which can be individually cut to provide a more continuous smooth angular finished surface. The use of thicker paper can also be considered where a quicker build is required as the layering of thicker sheets will develop the necessary height quicker than layering of thinner sheets. This could be beneficial when a design needs to be tested initially but once decided upon the finished article will be constructed using thinner sheets to give a better overall finish.

While in the embodiment described the wheel of the dispensing device is mounted to move in straight lines an to apply adhesive in straight lines, it will be appreciated that in an alternative arrangement, the entire adhesive dispensing system could be mounted to enable rotation about its own vertical axis. This would enable the wheel to follow the contour of the shape being made. This arrangement would provide for increased speed of the adhesive dispensing process while removing the need to prime the wheel as it would always rotate in the same direction.

While in the embodiment described the applicator contact surface 14 is provided formed on the circumference of the wheel, it will be appreciated that in an alternative embodiment the contact surface 14 may have a ring form and that the ring may be removable and replaceable, for example, a number of different rings comprising recesses of different dimensions or of different spacing may be provided for fitting to the wheel.

It will be appreciated and understood that what has been described herein are exemplary arrangements of a layered object manufacturing system. Use of such a system provides for the use of water based adhesives to bind successive layers of paper in generation of a three dimensional model. The paper can be provided in conventional paper sizes and is moveable within the system from a storage stack to a build object location, individual pages at a time. The system typically effects the application of adhesive onto the paper using an adhesive applicator wheel having a plurality of circumferentially spaced apart recesses for receiving adhesive. The wheel is rotatable to convey adhesive filled in one or more recesses to a target substrate and to deposit controlled amounts of adhesive at discrete points thereon.

The invention provides a system and method of applying adhesive to paper which ensures that the paper does not become saturated with adhesive thus minimising warping of the sheet. The warping of the page is minimised by the fact that the quantity of adhesive deposited onto the substrate may be controlled as required. By providing precise control of the amounts of adhesive deposited on a substrate, it is possible to use water based adhesives for example, Polyvinyl Acetate (PVA). The system similarly facilitates the use of different and standard types of paper. The system thus uses conventional and readily available raw materials for example standard office paper and has the advantages of being user-friendly and easy to operate and supply. It will be understood that by providing a LOM process that uses water based adhesives and can be used with conventional paper supplies that recycling and waste issues are less problematic than with existing RP solutions. The paper supply that is used in the LOM process can be waste or discarded paper, and the waste paper from the LOM process can be easily recycled in the same manner as conventional recycling. The discard of water based adhesives is easier than discarding solvents or plastics such as are used in existing RP processes.

The provision of a multifunction head supporting the adhesive dispensing portion, and the cutter/grabber portion on the same head eliminates the need to provide separate mounting and moving means to effect movement of each of these components individually. The provision of a grabber portion on the multifunctional head of the system of the invention effectively eliminates the need for a paper feeder system. The use of a head mounted grabber facilitates ease in positioning of a sheet of paper on the build plate in the situation of the LOM where the grabber is positioning a sheet onto a sheet of paper bearing an adhesive layer.

The system may further be used with sheets of paper which is advantageous from the point of view of operation and maintenance eliminating problems associated with the handling of rolls.

The possibility of using water based adhesive addresses the further environmental issues and concerns relating to the use and handling of solvent based adhesives The system of the invention further provides excellent control on the positioning of the adhesive on a substrate. The density of adhesive laid down may also be controlled. These features help to eliminate waste of adhesive.

The device and system of the invention further include design features to prevent the build up of adhesive and resultant clogging. An automatic cleaning feature may also be provided with advantages from the point of view of maintenance of the device and system.

A system provided in accordance with the present teaching may employ standard, for example A4, sheets of paper that are neither pre coated underneath with pressure sensitive adhesive or bonded to each other using xerographic techniques, for example, using "sticky" ink binder. In this way such a system is very environmentally friendly as it uses standard paper and a water based PVA adhesive. The system is economic to operate in comparison with prior art systems in that both the standard paper and the water based adhesive are readily sourced from mainstream suppliers. Furthermore, such a system can use recycled paper for example that has already been run through a regular 2D printer/office printer, further reducing the costs of operation.

While preferred embodiments have been described with reference to the figures modifications can be made without departing from the scope of the invention which is to be limited solely by the claims. Where integers or components are described with reference to one figure it will be understood that they can be interchanged with those of another Figure without departing from the context of the invention.

The words comprises/comprising when used in this specification are to specify the presence of stated features, integers, steps or components but does not preclude the presence or addition of one or more other features, integers steps, components or groups thereof.

What is claimed:

1. A method of rapid prototyping, comprising:
generating a three dimensional model using a stack of individual sheets of paper that are successively bound to one another using a water based adhesive;
providing controlled application of the water based adhesive to specific locations of the paper;
separating the three dimensional model from scrap material; and
discarding the scrap material.

2. The method of claim 1, wherein when the 3 dimensional model is completed, removing a build object from a machine.

3. The method of claim 1, including a subsequent step of adhering two or more three dimensional models to one another using a water based adhesive to generate a larger three dimensional model.

4. A method of rapid prototyping to form a three dimensional model comprising generating a three dimensional model using a stack of individual sheets of paper that are successively bonded to one another using a water based adhesive, the method comprising:
(1) attaching a first sheet of paper to define a base of a build object to a build plate;
(2) depositing the water based adhesive to an upwardly facing surface of the first sheet of paper;
(3) placing a subsequent sheet of paper on the adhesive on the upwardly facing surface of the previous sheet of paper of the build object to define a layer of the build object;
(4) cutting a two dimensional profile, comprising operating a cutter to describe a path of the two dimensional profile of said layer of the build object and in doing so cutting out a form of that particular layer of the model;
(5) depositing the water based adhesive in controlled amounts to specific locations of an upwardly facing surface of a topmost sheet of paper on the build plate;
(6) placing a next sheet on a topmost adhesive layer of the build object to define a next layer of the build object;
(7) repeating steps (3) to (6) until the entire three dimensional model has been built up layer by layer.

5. The method of claim 4, wherein cutting the 2D profile further comprises making a series of dicing cuts inside and outside the cut profile of that layer to aid the removal of waste material by dicing up a waste portion of the layer into small squares.

6. The method of claim 4, wherein depositing the water based adhesive to a layer of the build object comprises selectively applied adhesive at a higher density at those portions of a substrate which are part of the build object, and at a lower density at those portions which are to be cut away.

7. The method of claim 4, further comprising pressing the next sheet after placement on the topmost adhesive layer to bond to the build object before cutting.

8. The method of claim 4, wherein once the cutting of a layer is complete the build plate is raised to make contact with a hot plate.

9. The method of claim 4, wherein when the three dimensional model is completed, removing the build object from the machine.

10. The method of claim 4, wherein the build object comprises an unweeded diced block of paper containing the 3D model inside.

11. The method of claim 4, wherein diced cubes of waste material are removable and wherein the waste material received only minimum quantities of adhesive.

\* \* \* \* \*